US011731573B2

United States Patent
Saediamiri et al.

(10) Patent No.: US 11,731,573 B2
(45) Date of Patent: Aug. 22, 2023

(54) GRILL GUARD ASSEMBLY WITH OVER-CENTER LATCH ASSEMBLY

(71) Applicant: HERD NORTH AMERICA INC., Winnipeg (CA)

(72) Inventors: Meghdad Saediamiri, Winnipeg (CA); Randy John Delos Santos, Winnipeg (CA); Mohammadreza Farohki, Winnipeg (CA)

(*) Notice: Subject to any disclaimer, the term of this patent is extended or adjusted under 35 U.S.C. 154(b) by 196 days.

(21) Appl. No.: 17/394,917

(22) Filed: Aug. 5, 2021

(65) Prior Publication Data
US 2022/0048456 A1    Feb. 17, 2022

Related U.S. Application Data

(60) Provisional application No. 63/066,427, filed on Aug. 17, 2020.

(51) Int. Cl.
*B60R 19/52*    (2006.01)

(52) U.S. Cl.
CPC .................. *B60R 19/52* (2013.01)

(58) Field of Classification Search
CPC ... B60R 19/52; B60R 19/24; B60R 2019/522; B60R 19/38
USPC .......................... 293/115, 145, 119, 118, 155
See application file for complete search history.

(56) References Cited

U.S. PATENT DOCUMENTS

| | | | | |
|---|---|---|---|---|
| 2,146,801 A * | 2/1939 | De Orlow | ............... | B60R 19/46 293/145 |
| 2,562,620 A * | 7/1951 | Krueger | ............... | B62D 25/184 293/118 |
| 2,954,255 A * | 9/1960 | Bates | ..................... | B60R 19/46 293/145 |
| 3,173,717 A * | 3/1965 | Peras | .................... | B60R 19/023 293/118 |
| 4,076,092 A * | 2/1978 | Lorenz | ................... | B62D 49/06 180/69.2 |
| 5,624,143 A * | 4/1997 | Waldschmitt | ......... | B60P 1/6463 293/118 |
| 9,505,364 B1 * | 11/2016 | Schulzetenberg | ...... | B60R 19/52 |
| 2006/0097526 A1 * | 5/2006 | Connett | ................. | B62D 25/10 293/118 |
| 2009/0212581 A1 * | 8/2009 | Drever | .................... | B60R 19/52 293/115 |
| 2010/0283272 A1 * | 11/2010 | Schneider | ............... | B60R 19/54 293/115 |

(Continued)

*Primary Examiner* — Amy R Weisberg
*Assistant Examiner* — E Turner Hicks
(74) *Attorney, Agent, or Firm* — Ryan W. Dupuis; Kyle R. Satterthwaite; Ade & Company Inc.

(57) ABSTRACT

A grill guard assembly has a vehicle coupling portion mounted to the vehicle forwardly of the vehicle grill. A hinge couples a coupling portion of a grill guard frame on the vehicle coupling portion to pivot between a working position extending primarily upwardly and a lowered position extending primarily forwardly. A latch assembly has a clamping surface and a clamping jaw supported on opposing ones of the vehicle coupling portion and the grill guard coupling portion. An over-center linkage operatively connects the clamping jaw to the respective coupling portion and the second coupling portion such that the linkage is rotated through an over-center position between open and closed positions of the jaw, whereby the clamping force of the jaw acts to urge the jaw to remain closed.

14 Claims, 10 Drawing Sheets

(56) References Cited

U.S. PATENT DOCUMENTS

| | | | |
|---|---|---|---|
| 2015/0343974 A1* | 12/2015 | Drever | ...................... E05C 3/14 |
| | | | 292/19 |
| 2020/0346601 A1* | 11/2020 | Drever | .................... B60R 19/52 |
| 2021/0155181 A1* | 5/2021 | Drever | .................... B60R 19/52 |
| 2022/0153216 A1* | 5/2022 | Drever | .................... B60R 19/52 |

* cited by examiner

GRILL GUARD ASSEMBLY WITH OVER-CENTER LATCH ASSEMBLY

This application claims the benefit under 35 U.S.C. 119(e) of U.S. provisional application Ser. No. 63/066,427, filed Aug. 17, 2020.

FIELD OF THE INVENTION

The present invention relates to a grill guard assembly including a grill guard frame for protecting the front grill of highway tractor trucks, and other vehicles, and more particularly the present invention is related to a grill guard assembly for a vehicle which can be pivoted away from an upright working position in front of the front grill upon release of a latch assembly.

BACKGROUND

Highway tractor trucks are commonly used to transport cargo trailers along highways. In view of the many hazards that are present on roads, for example other vehicles, wildlife such as deer, and the like, it is common practice to mount a grill guard on the vehicle to protect the front grill of the vehicle from damage by impacts with such hazards. To maintain ready access to the engine compartment of the vehicle for servicing, it is common for grill guards to be hinged away from the upright working orientation of the grill guard by release of a latch assembly. A common latch assembly includes a hook that is pivotal between open and closed positions relative to a catch using a lever. A simple spring is typically directly connected to the pivoting hook to retain the hook in the closed position engaged upon the catch. Relying on a spring along can be problematic as the spring can corrode over time from exposure to road salt and the like, decreasing the reliability of the latch assembly to retain the grill guard in the upright working orientation during use of the vehicle.

SUMMARY OF THE INVENTION

According to one aspect of the invention there is provided a grill guard assembly for mounting forwardly of a front grill of a vehicle, the grill guard assembly comprising:

a vehicle coupling portion arranged for attachment to the vehicle;

a grill guard frame;

a grill guard coupling portion connected to the grill guard frame;

a hinge coupling the grill guard coupling portion to the vehicle coupling portion such that the grill guard frame is pivotal with the grill guard coupling portion relative to the vehicle coupling portion about a hinge axis between a working position in which the grill guard frame extends primarily upwardly from the hinge axis and a lowered position in which the grill guard frame extends primarily forwardly from the hinge axis;

a latch assembly comprising:

a clamping surface fixedly mounted on a first coupling portion among the vehicle coupling portion and the grill guard coupling portion;

a clamping jaw pivotally supported on a second coupling portion among the vehicle coupling portion and the grill guard coupling portion;

in the working position of the grill guard frame, the clamping jaw being pivotal relative to the second coupling portion between a closed position of the clamping jaw in which the clamping jaw is firmly clamped against the clamping surface by a clamping force to prevent pivotal movement of the grill guard frame from the working position to the lowered position and an open position of the clamping jaw in which the grill guard frame is pivotal from the working position to the lowered position without interference from the clamping jaw;

an over-center linkage connected between the clamping jaw and the second coupling portion, the over-center linkage being rotated through an over-center position between the open position and the closed position of the clamping jaw;

whereby the clamping force of the clamping jaw against the clamping surface in the closed position urges the clamping jaw into the closed position and away from the over-center position.

The over-center linkage can be configured to more firmly retain the latch assembly in the closed position than prior art arrangements that rely on a spring acting on a simple pivoting hook. The over-center linkage can be manufactured much robustly than a sprung hook such that the linkage is also more resistant to degradation from corrosion and the like over time. Optionally, an additional biasing linkage may be cooperatively connected to the over-center linkage to further assist in retaining the latch assembly in either fully open or fully closed positions.

Preferably the over-center linkage comprises a first link pivotally coupled to the clamping jaw and a second link pivotally coupled to both the first link and the second coupling portion. The first link and the second link of the over-center linkage may be in alignment 180 degrees apart from one another in the over-center position.

A lever handle may extend outwardly from the second link of the over-center linkage so as to be arranged to be grasped in a hand of a user.

In one embodiment, the clamping surface is located on a receiver member of the first coupling portion and the grill guard assembly further comprises a second jaw mounted on the second coupling portion, in which the second jaw is located opposite the clamping jaw so as to receive the receiver member clamped therebetween in the closed position of the clamping jaw. Preferably the second jaw is resiliently supported relative to the second coupling portion.

The second jaw may be adjustable in position relative to the second coupling portion in an adjustment direction oriented transversely to the clamping surface in the working position.

Preferably a clamping face of the second jaw is parallel to a clamping face of said clamping jaw in the closed position of the clamping jaw.

A biasing linkage may be further connected to the over-center linkage, in which the biasing linkage includes a spring arranged to bias the over-center linkage in the closed position to remain in the closed position. The spring of the biasing linkage may be further arranged to bias the over-center linkage in the open position to remain in the open position. Preferably, the spring of the biasing linkage (i) biases the over-center linkage towards the open position throughout a range of movement of the over-center linkage between the over-center position and the open position and (ii) biases the over-center linkage towards the closed position throughout a range of movement of the over-center linkage between the over-center position and the closed position.

The grill guard assembly may further comprise: (i) the over-center linkage comprising a first link pivotally coupled to the clamping jaw and a second link pivotally coupled to both the first link and the second coupling portion; (ii) the biasing linkage comprising a first member pivotally coupled to the clamping jaw and a second member pivotally coupled to both the first member and to the first link of the over-center linkage; (iii) the clamping jaw, the first link of the over-center linkage, the first member of the biasing linkage, and the second member of the biasing linkage defining four bars of a 4-bar linkage; and (iv) the spring being connected between an adjacent pair of the four bars of the 4-bar linkage.

The clamping surface on the first coupling portion may extend towards the opposing coupling portion at an upward slope.

In the illustrated embodiment the first coupling portion is the vehicle coupling portion and the second coupling portion is the grill guard coupling portion such that the clamping surface extends forwardly at an upward slope; however, in further embodiments, the first and second coupling portions may be reversed.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures, there is illustrated a vehicle grill guard assembly generally indicated by reference numeral 10. The assembly 10 is particularly suited for mounting on a vehicle 12 at a location forwardly of the front grill 14 of the vehicle for protecting the front grill from impacts.

The vehicle grill guard assembly 10 generally includes a vehicle coupling portion 16 arranged for attachment to the vehicle, a grill guard frame 18 formed of rigid frame members to span across the front grill of the vehicle, a grill guard coupling portion 20 rigidly connected to the grill guard frame, a hinge 22 pivotally coupling the grill guard coupling portion to the vehicle coupling portion, and an over centre latch assembly 24 for selectively latching the grill guard frame in fixed relation to the vehicle coupling portion. The hinge 22 specifically couples the grill guard coupling portion 20 for pivotal movement relative to the vehicle coupling portion about a hinge axis between a working position in which the grill guard frame extends primarily upward from the hinge axis at the bottom end thereof and a lowered position in which the grill guard frame extends primarily forwardly from the hinge axis.

The latch assembly is operable in the working position of the grill guard frame between a closed position preventing pivotal movement of the grill guard frame from the working position to the lowered position and an open position in which the grill guard frame is pivotal from the working position to the lowered position without interference from the latch assembly. The latch assembly includes an over centre linkage 25 that is movable through an over centre position between the open position and the closed position of the latch assembly and is configured such that a clamping force of the latch assembly in the closed position specifically urges movement of the clamping force away from the over centre position to the closed position for retaining the latch assembly in the closed position.

The vehicle coupling portion 16 comprises a pair of mounting plates 26 arranged to be attached to front vehicle mounts 28 of the vehicle situated at laterally spaced apart positions at opposing sides of the front grill 14 of the vehicle. One or more clamping fasteners 30 are secured to each mounting plate 26 for extending through a respective frame member of the vehicle relative to which the mounting plates are fixedly mounted. A pair of upright channels 32 are mounted on the two mounting plates 26 respectively. Each upright channel includes a back plate 34 mounted with fasteners to the respective mounting plate 26 using vertically spaced apart fasteners such that the back plate 34 is vertically oriented, perpendicularly to the forward working direction of the vehicle. The upright channel 32 is elongate in height and further includes two side plates 36 which are parallel and laterally spaced apart from one another to extend forwardly from opposing side edges of the back plate 34.

The hinge 22 includes two pivot sleeves 38 mounted on the two upright channels 32 of the vehicle coupling portion respectively so as to be laterally spaced apart while commonly defining the hinge axis of the hinge extending therebetween. Each pivot sleeve 38 extends between the two side plates 36 of the respective upright channel 32 adjacent the bottom end thereof.

The latch assembly 24 includes a pair of receiver members 40 fixedly mounted on the two upright channels 32 of the vehicle coupling portion respectively. Each receiver member 40 is a flat plate spanning laterally between the two side plates 36. Each receiver member 40 extends forwardly towards the grill guard coupling portion 20 at an upward slope of approximately 45 degrees from horizontal. Each receiver member 40 thus defines an upper clamping surface 42 on the top side thereof which faces upwardly and extends forwardly at the upward slope of the receiver member. The opposing lower surface of the receiver member is parallel to the upper clamping surface 42.

A stop member 44 of the vehicle coupling portion is supported on each of the upright channels 32. The stop member 44 is a generally U-shaped bar having side portions extending forwardly from the two side plates 36 of the upright channel respectively and a forward portion joined between the side portions at the forward end of the side portions. Each stop member 44 fits within a corresponding portion of the grill guard coupling portion 20 on the grill guard frame 18 to prevent further rearward pivotal movement of the grill guard frame away from the lowered position in the working position, particularly during an impact or accident for example.

The grill guard coupling portion 20 further includes two mounting channels 46 at laterally spaced apart positions on the grill guard frame for receiving the upright channels 32 of the vehicle coupling portion therein respectively in the working position. Each mounting channel 46 thus similarly comprises an elongate channel which is generally U-shaped in cross-section so as to comprise a front plate 48 which is generally upright and perpendicular to the forward working direction of the vehicle in the working position and two side plates 50 extending rearward from opposing sides of the front plate 48 to receive the respective upright channel 32 between the side plates 50.

Two pivot shafts 52 of the hinge are mounted within the two mounting channels 46 respectively, adjacent the bottom end thereof in the working position, such that each pivot shaft 52 extends between the side plates 50 of the respective mounting channel 46. The pivot shafts 52 are received within respectively pivot sleeves on the vehicle coupling portion as described in further detail below.

A bottom gusset plate 54 spans between the side plates 50 of each mounting channel 46 in proximity to the bottom end thereof while being spaced slightly above the hinge axis in the working position of the grill guard frame. Similarly, a top gusset 56 is connected between the side plates 50 of each mounting channel 46 in proximity to the top end thereof while remaining spaced slightly below the top end in the working position of the grill guard frame.

The grill guard frame 18 according to the illustrated embodiment generally includes a lower portion 58 comprised of three crossbars extending laterally between the two mounting channels 46 at different elevations respectively corresponding to (i) the bottom ends of the channels, (ii) the top ends of the channels, and (iii) an intermediate location along each channel. The guard frame also includes an upper portion 60 comprised of two uprights 62 extending generally upward from the two mounting channels 46 respectively and a pair of crossbars extending laterally between the two uprights 62. The grill guard frame further includes two wing portions 64 comprised of frame members extending laterally outwardly from the outer sides at laterally opposing ends of the lower portion 58 and the upper portion 60 respectively. In further embodiments, a different arrangement of crossbars and wing portions formed of rigid frame members may be provided. In either instance, all of the portions of the grill guard frame are fixed in relation to one another and the mounting channels 46 defining the grill guard coupling portion so as to be pivotal together about the hinge axis of the hinge relative to the vehicle coupling portion between the working position in the lowered position thereof.

As described above, the hinge 22 is generally defined by the laterally spaced apart pivot shafts 52 on the bottom ends of the mounting channels 46 of the grill guard coupling portion which are pivotally coupled to and received within respective pivot sleeves 38 mounted on the bottom ends of the upright channels 32 of the vehicle coupling portion 16.

The latch assembly 24 generally includes two latches 66 in which each latch is operatively connected between one of the upright channels 32 of the vehicle coupling portion and the corresponding mounting channel 46 of the grill guard coupling portion. Each latch 66 includes the upper clamping surface 42 on the corresponding receiver member 40 relative to which an operating portion of the latch 66 is displaced between the open and closed positions thereof. In the illustrated embodiment in which the clamping surface is supported on the vehicle coupling portion, the operating portion of each latch 66 is thus supported on the grill guard coupling portion within the respective mounting channel 46.

The operating portion of each latch 66 includes a support plate 68 having fastener apertures therein to enable the support plate 68 to be fixedly fastened in relation to the top gusset plate 56 of the respective mounting channel 46. The support plate 68 is horizontally oriented in parallel abutment directly below the corresponding top gusset plate 56 in the working position of the grill guard frame.

A pair of anchor plates 70 of the operating portion of each latch 66 are fixedly coupled to the support plate 68 in perpendicular relation thereto such that the anchor plates extend primarily downwardly from the support plate in the working position. The anchor plates 70 are parallel to one another so as to be vertically oriented in parallel relation to the forward working direction of the vehicle. In the working position, upper portions of the anchor plates 70 extend above the support plate 68 which is in turn spaced above the receiver member 40. The anchor plates 70 extend downward by a sufficient height so that the bottom ends of the anchor plates are below the receiver member 40 in the working position of the grill guard frame.

A lower portion 72 of the anchor plates in the working position is sloped downwardly and rearwardly at a slope of approximately 45 degrees so as to lie in close proximity to and at the same slope as the lower surface of the corresponding receiver member 40. The lower portion 72 of the anchor plates provides support against the bottom side of the receiver member 40 when closing the latches as described in further detail below.

Each latch 66 further includes a clamping jaw 74 received between the anchor plates for pivotal connection relative to the anchor plates by a pivot shaft 76 connected between the anchor plates. Each clamping jaw is pivotally coupled at an inner end thereof by a pivot shaft 76 so as to extend generally rearward from the pivot shaft. A clamping face 78 of the clamping jaw faces generally downwardly for engaging the upper clamping surface 42 of the respective receiver member in the closed position of the latch.

More particularly, in the open position, the clamping jaw 74 extends generally rearward with the clamping face 78 being near horizontal in orientation so that the outer free end of the clamping face is positioned above the receiver member and so that there is no interference by the latch 66 with regard to pivotal movement of the grill guard frame forwardly from the working position to the lowered position thereof. In the closed position, the clamping jaw 74 extends generally downwardly and rearwardly at a slope matching the slope of the upper clamping surface of the receiver member 40.

The over centre linkage 25 is pivoted beyond the over centre position thereof towards the closed position in a manner which applies a clamping pressure between the clamping face 78 of the clamping jaw and the upper clamping surface of the receiver member 40 between the over centre position and the closed position. This clamping pressure applied by the over centre linkage acts in a direction which continues to urge rotation of the latch towards the closed position and away from the over centre position such that the latch retains itself in the closed position.

The over centre linkage 25 of each latch 66 includes a first link 80 defined by two parallel link members at opposing outer sides of the anchor plates 70, in which the link members move together to define the orientation and movement of the first link. The first link 80 is pivoted at a first end of the first link on the clamping jaw 74 at an intermediate location between the pivot shaft 76 at the inner end of the clamping jaw and the clamping face 78 at the outer end of the clamping jaw. The first link extends from the first end towards the second end thereof generally upwardly and forwardly in the closed position of the latch and generally upwardly and rearwardly in the open position of the latch.

The over centre linkage 25 of each latch 66 also includes a second link 82 formed by a pair of rigid plates received between the anchor plates in the illustrated embodiment, in which the rigid plates form link members that move together to define the orientation and movement of the second link. Alternatively, the two rigid plates may be a single plate having an overall thickness which is twice that of the individual plates that are laminated together in the illustrated embodiment. The second link 82 is pivoted at a first end of the second link on the second end of the first link 80 by a suitable pivot shaft extending through both link members of the first and second links. The opposing second end of the second link 82 is pivotally received between the anchor plates, at the top end thereof, above the support plate 68, and forwardly of the pivotal connection at the first end of the clamping jaw.

Each second link 82 also supports a lever handle 84 thereon which is fixedly connected relative to the second link 82 for pivotal movement together therewith between the open and closed positions of the latch. The lever arm includes a lower arm 86 extending generally rearward in the closed position and extending generally rearward at an upward slope in the open position. The lever handle also includes an upper arm 88 suitable for being gripped in a hand of the user so as to extend vertically upward in the closed position while extending generally upwardly and forwardly in the open position while the grill guard frame remains in the working orientation.

Figure 10:
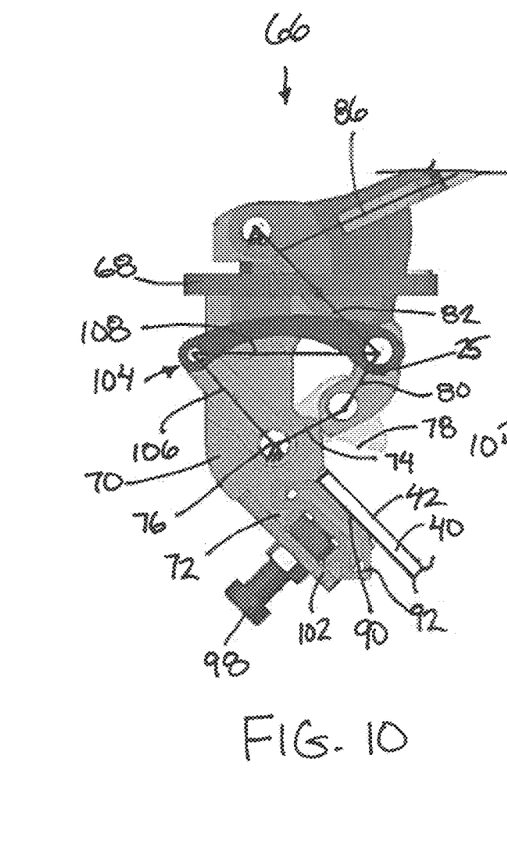
FIGS. 10, 11, and 12 are side elevational views of the latch assembly including a schematic representation of the over-center linkage and the biasing linkage, shown in the open position, an intermediate over-center position, and in a closed position respectively for comparison.
Figure 11:
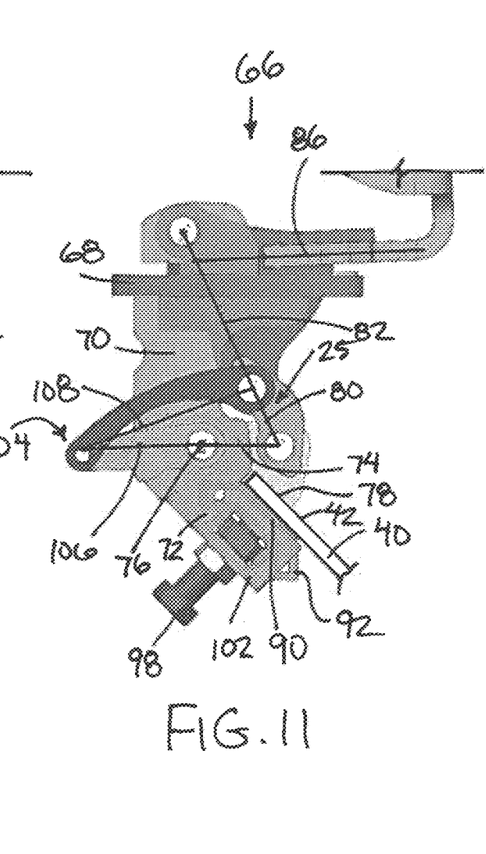
Figure 12:
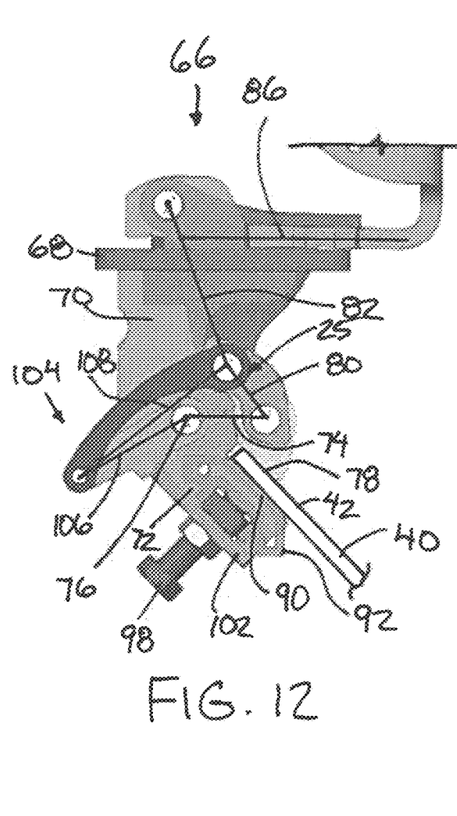

As shown in FIGS. 10 through 12, the over centre linkage can be pivoted from an open position of FIG. 10 to the closed position of FIG. 12 through the over centre position of FIG. 11 therebetween. In the over centre position, a longitudinal axis of each of the first link 80 and the second link 82 are co-linear with one another as the first and second links are 180 degrees apart from one another by extending in diametrically opposing directions from the pivotal connection therebetween. More particularly the aligned first and second links extend at an upward and forward inclination from (i) the pivotal connection to the clamping jaw at the bottom end thereof, to (ii) the pivotal connection of the second link on the anchor plates at the top end thereof.

The clamping face of the clamping jaw snugly engages the upper clamping surface 42 of the receiver member in the closed position in which each of the first and second links is rotated only a few degrees beyond the over centre position to reach the closed position. The first and second links are thus slightly misaligned with one another by a few degrees in the closed position. Returning the first and second links from the closed position towards the over centre position thus requires a slight elongation of the over centre linkage by returning the first link 80 and the second link 82 to a co-linear orientation of the over centre position of FIG. 11. This elongation of the linkage from the closed position to the over centre position increases the clamping pressure required so that the over centre linkage must be initially rotated against the biasing from the closed position to the over centre position in order to release the linkage from the closed position. Once rotated past the over centre position, the overall length of the over centre linkage is again shortened from the over centre position of FIG. 11 to the open position of FIG. 10 to allow the clamping jaw to be lifted into the open position.

Any slack in the linkage produced by rotating the over centre linkage through the over centre position to the closed position can be taken up by resiliently suspending a second jaw 90 below the receiver member 40 in the working position of the grill guard frame. More particularly the second jaw 90 is supported on the lower portion 72 of the anchor plates.

The second jaw 90 is formed by two damper members 92 in the form of parallel plates which are abutted laterally adjacent one another between the two anchor plates while similarly lying parallel to the anchor plates. The damper members that are joined together include a central opening extending laterally therethrough between the anchor plates such that an upper portion 94 of the damper members is suspended spaced above a lower portion 96 of the damper members. The upper portion 94 has a flat upper surface which defines the clamping face of the second jaw 90 that is situated in parallel abutment against the lower surface of the receiver member 40 in the working position, in protruding relation relative to adjacent surfaces of the lower portion 72 of the anchor plates. The lower portion 96 of the damper members is abutted against a mounting bolt 98 fastened relative to the anchor plates 70. A pair of side portions 100 are connected between the upper portion 94 and the lower portion 96 of the damper members at opposing sides of the central opening through the damper members such that the side portions resiliently support the upper portion 94 relative to the lower portion.

The mounting bolt 98 is adjustably and fixedly secured in a bore within a bottom plate 102 fixed between the anchor plates 70 while having an axis oriented perpendicularly to the clamping surface of the second jaw. Rotating the mounting bolt 98 about its axis relative to a pair of nuts clamped against opposing sides of the bottom plate 102 causes displacement of the mounting bolt in the direction of the axis thereof perpendicularly to the clamping surface which in turn adjusts the position of the lower portion of the damper members towards and away from the receiver member 40 in the working position of the grill guard frame. The mounting bolt 98 thus serves to adjust the position of the damper members 92 relative to the receiver member 40 and relative to the anchor plates. Adjustment of the mounting bolt thus also adjust how far the upper portion 94 of the damper members protrudes above the corresponding surface of the lower portion 72 of the anchor plates that is positioned in close proximity to the underside of the receiver member 40 in the working position.

Flexing of the side portions 100 of the damper members permits the upper portion 94 defining the clamping surface of the second jaw 90 to be resiliently deflected relative to the anchor plates during displacement of the latches into the closed position. The side portions 100 are formed integrally with the upper portion 94 and the lower portion 96 of the damper members out of a rigid metal material that permits some slight elastic deformation of the side portions to resiliently support the upper portion 94 relative to the anchor plates.

The purpose of the second jaw is to provide a snug engagement against the lower surface of the receiver member 40 as the clamping jaw clamps against the opposing upper clamping surface 42 of the receiver member 40. Due to the lengthening of the linkage as it is displaced through the over centre position, the resulting over rotation of the clamping jaw 74 relative to the anchor plates 70 enables the receiver member 40 to be deflected further forwardly and downwardly relative to the anchor plates than the closed position. The second jaw 90 remains in firm engagement with the underside of the receiver member 40 as the receiver member is deflected relative to the anchor plates beyond the closed position by resiliently retracting the upper portions of the damper member 92 downwardly and forwardly relative to the lower portion 72 of the anchor plates.

Figure 1:
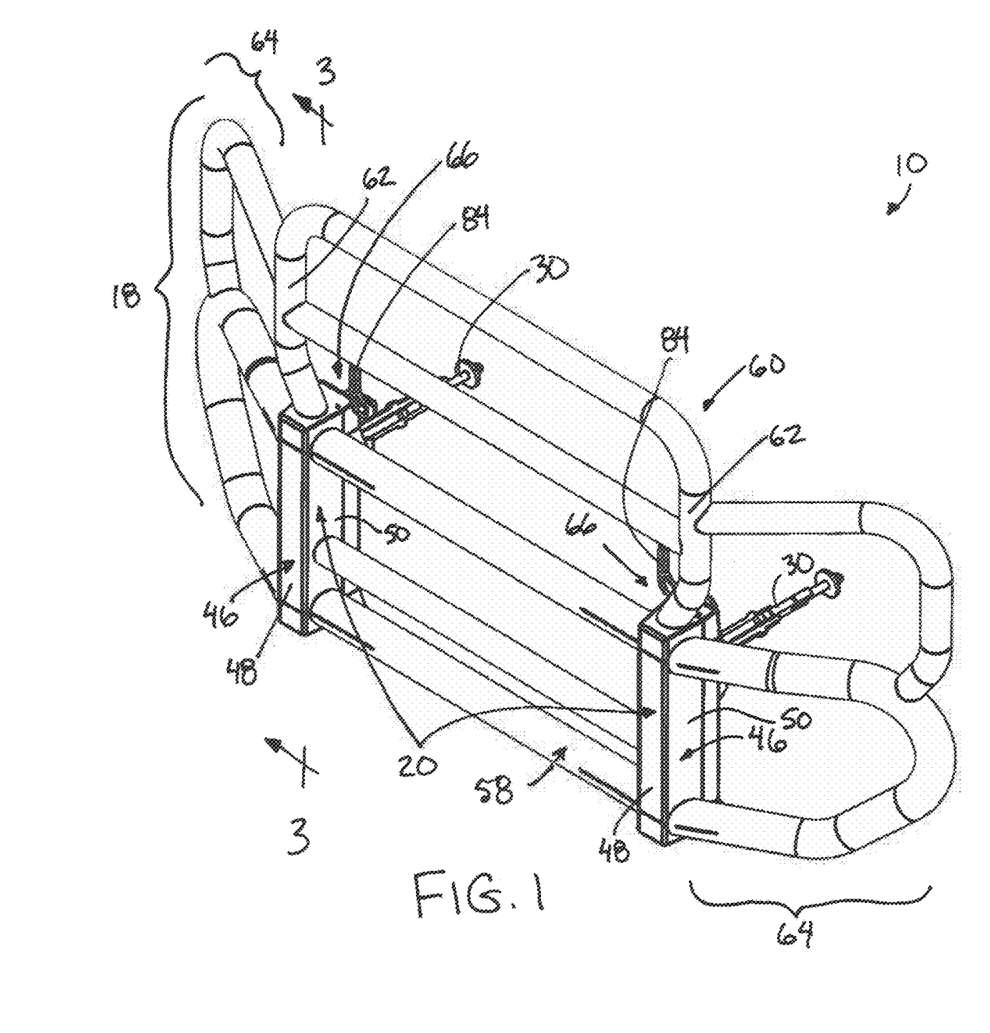
FIG. 1 is a perspective view of the grill guard assembly in a working position with the latch assembly in the closed position.
Figure 2:
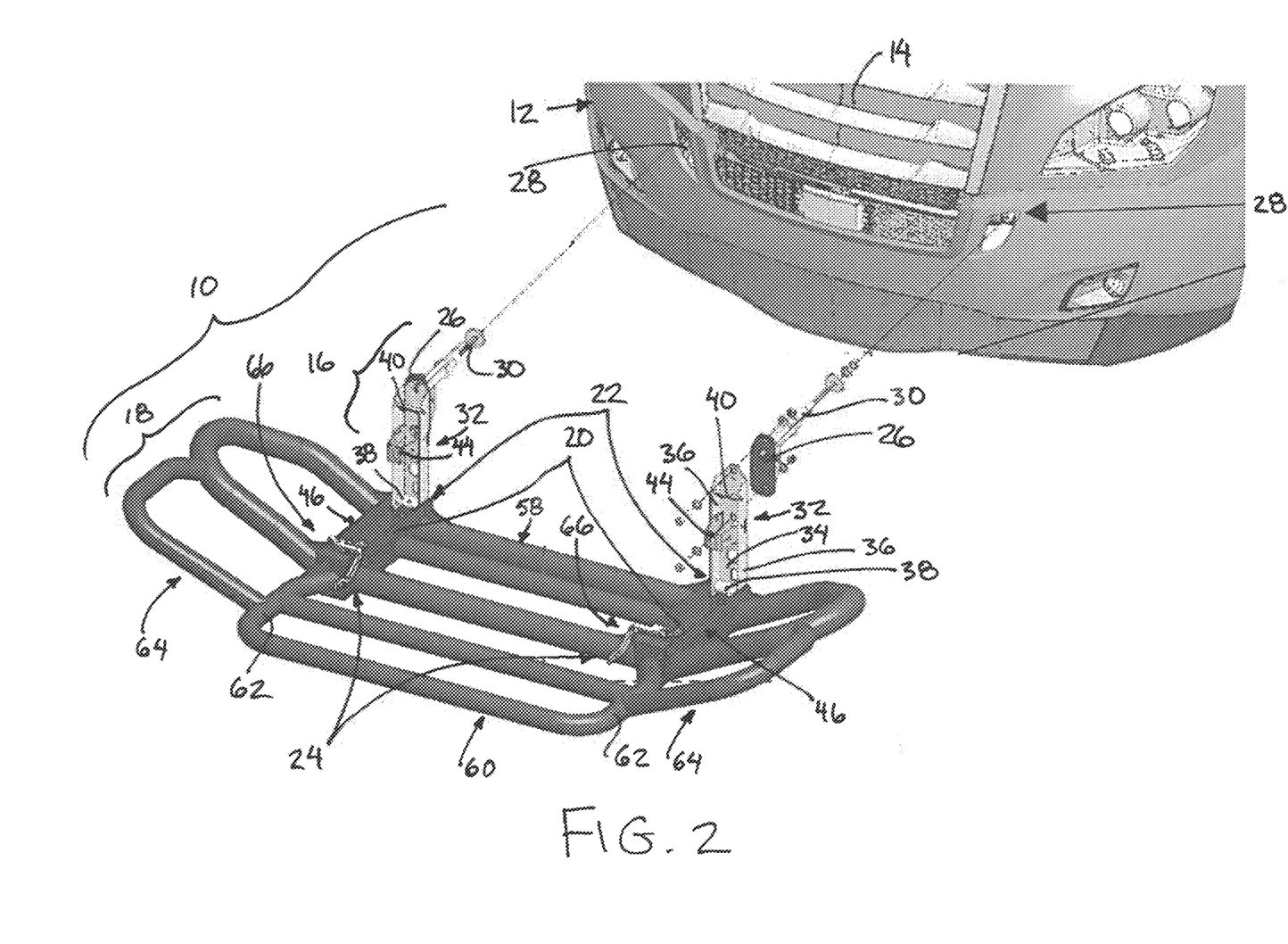
FIG. 2 is a perspective view of the grill guard assembly in the lowered position relative to a vehicle.
Figure 3:
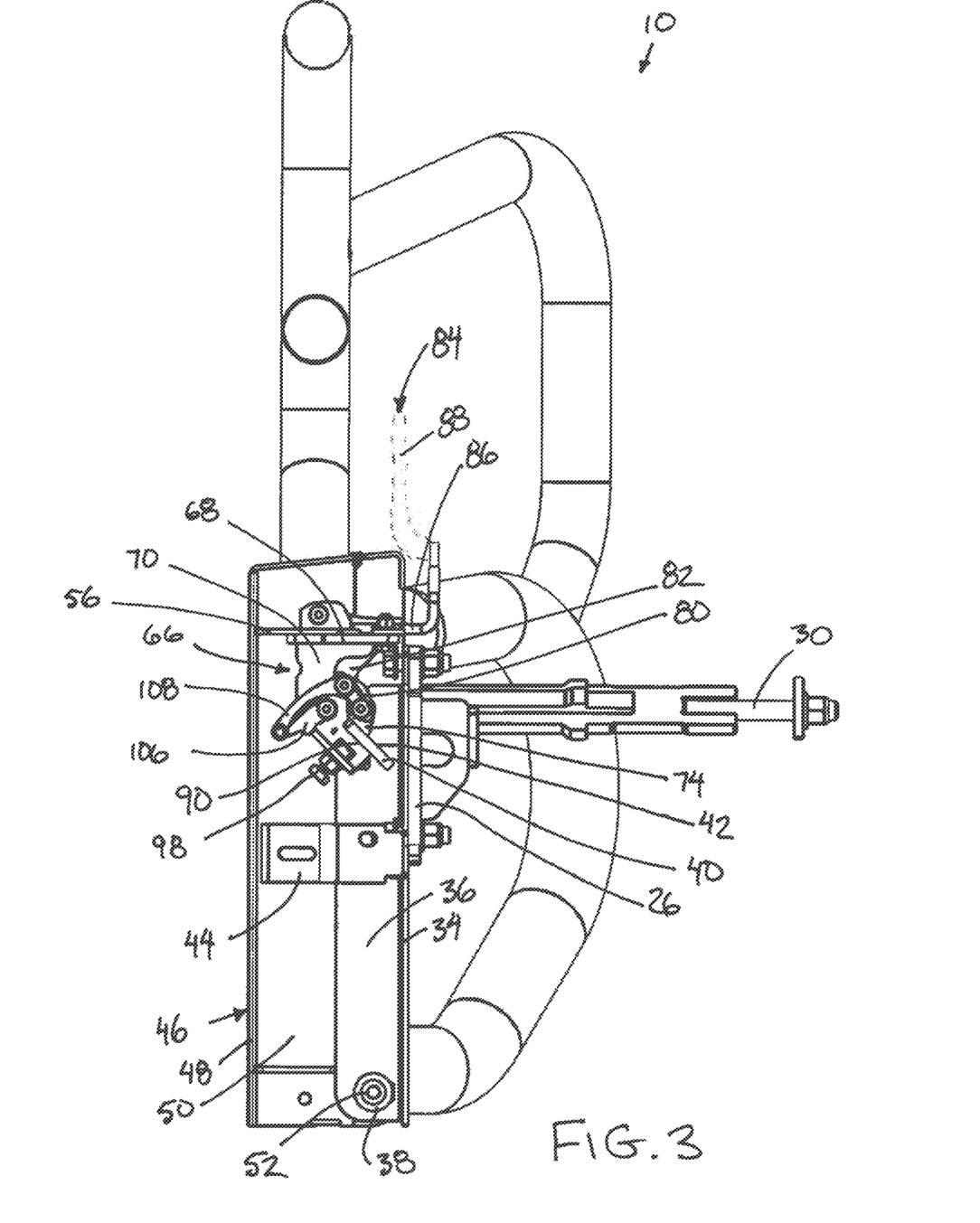
FIG. 3 is a sectional view along the line 3-3 in FIG. 1 showing the grill guard assembly in a working position with the latch assembly in the closed position.
Figure 4:
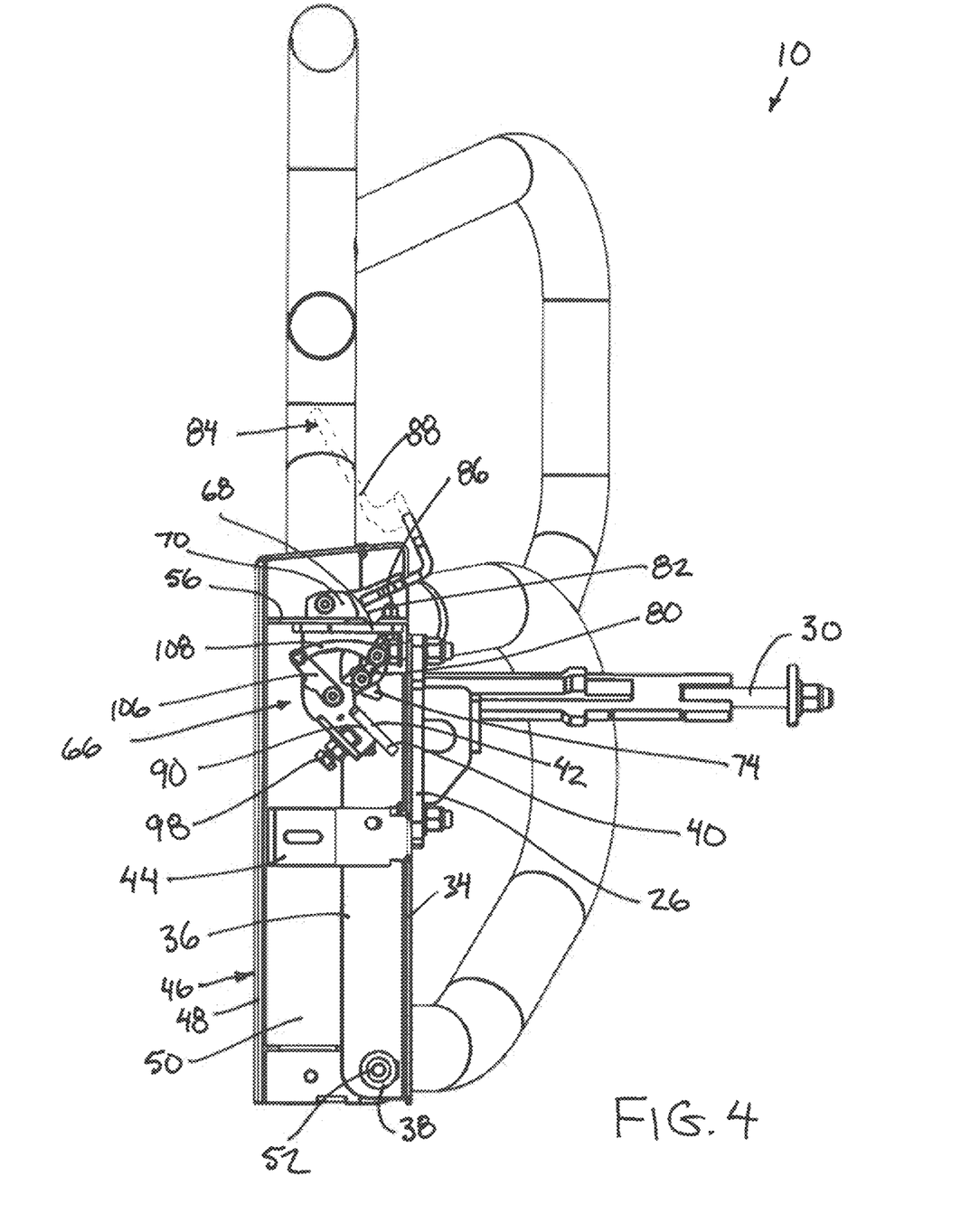
FIG. 4 is a sectional view along the line 3-3 in FIG. 1 showing the latch assembly in the open position.
Figure 5:
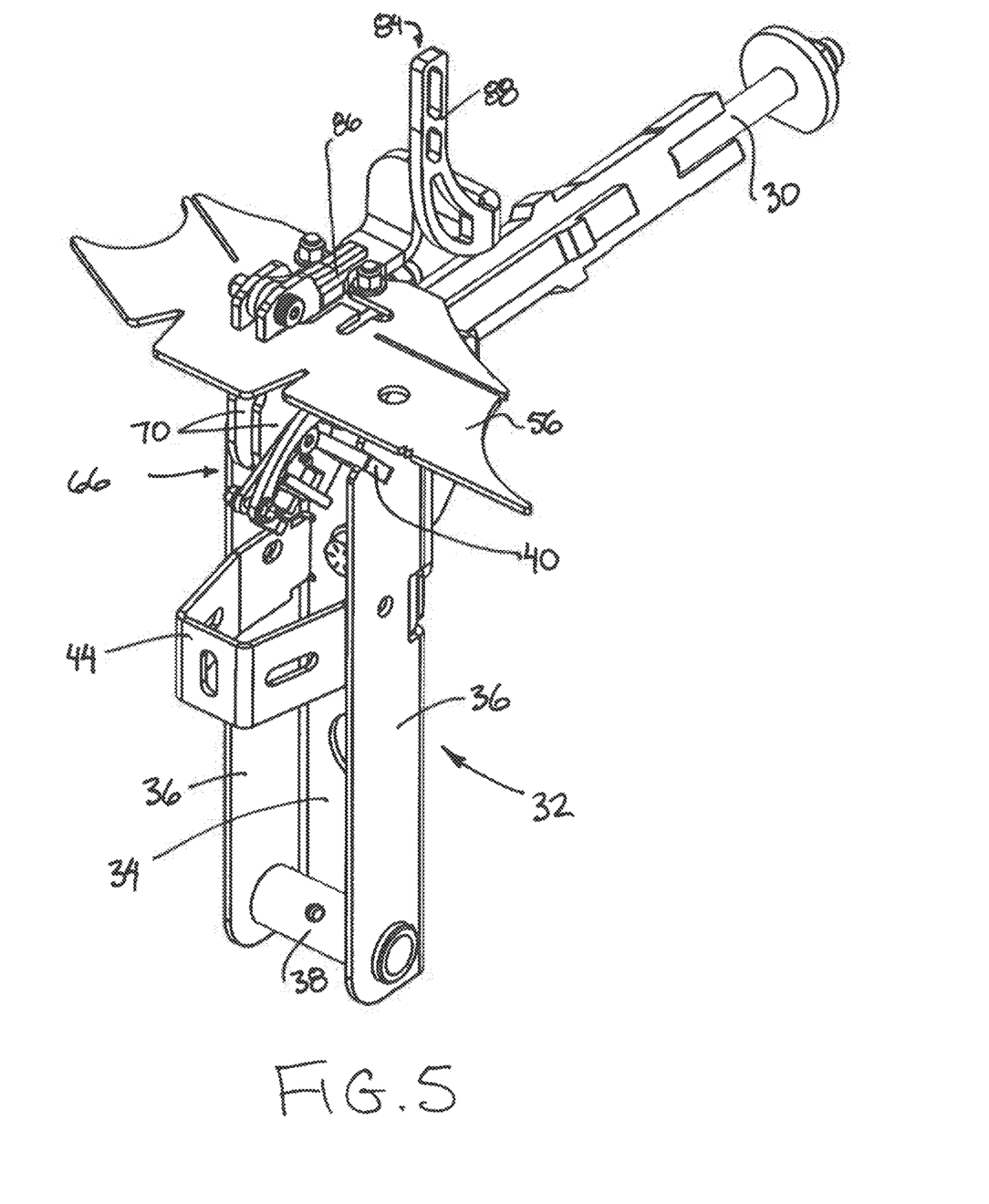
FIG. 5 is a front perspective view of the grill guard assembly of FIG. 1 with the grill guard and portions of the grill guard coupling portion shown removed for illustrative purposes.
Figure 6:
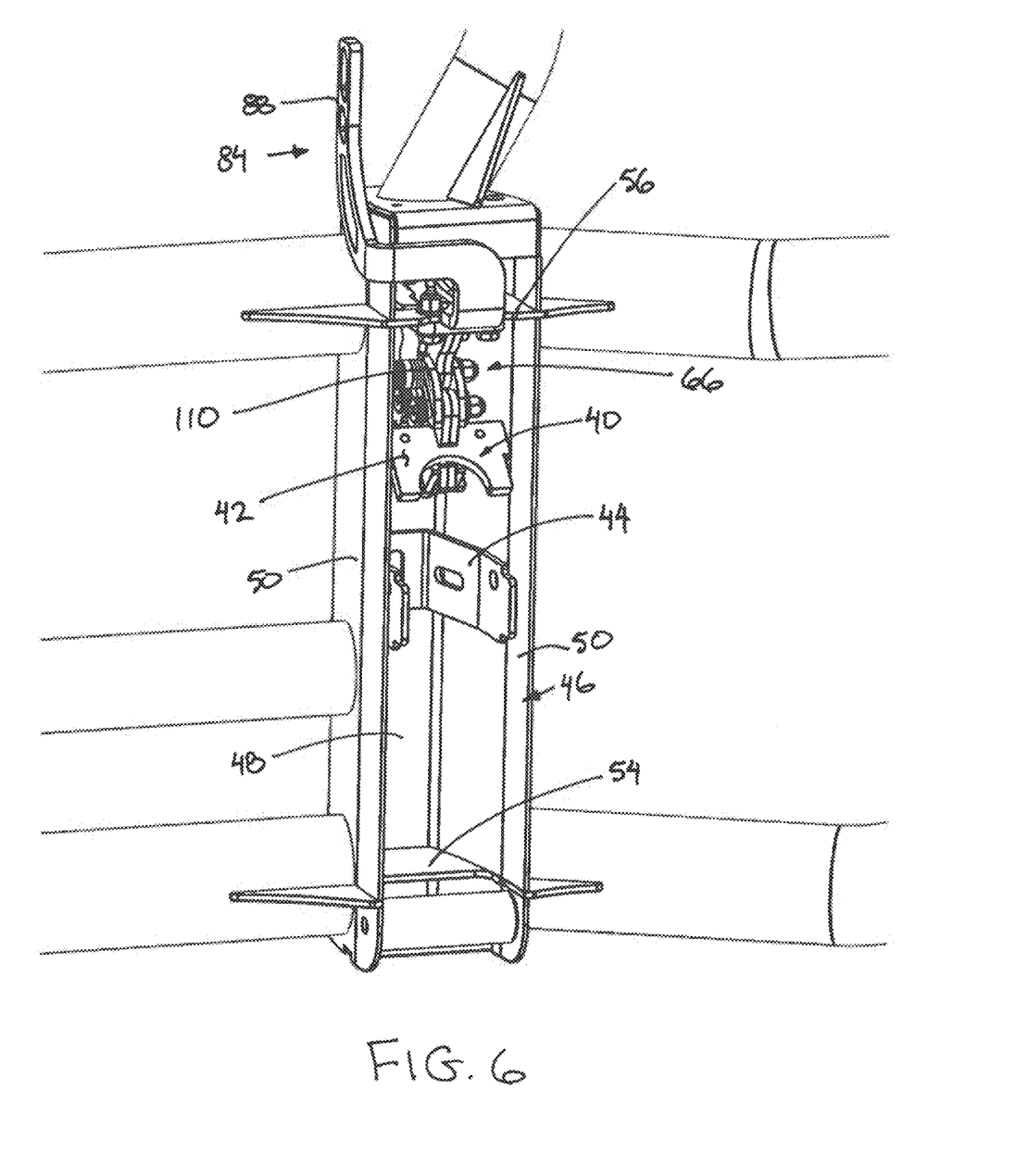
FIG. 6 is a rear perspective view of the grill guard assembly of FIG. 1 with portions of the vehicle coupling portion shown removed for illustrative purposes.
Figure 7:
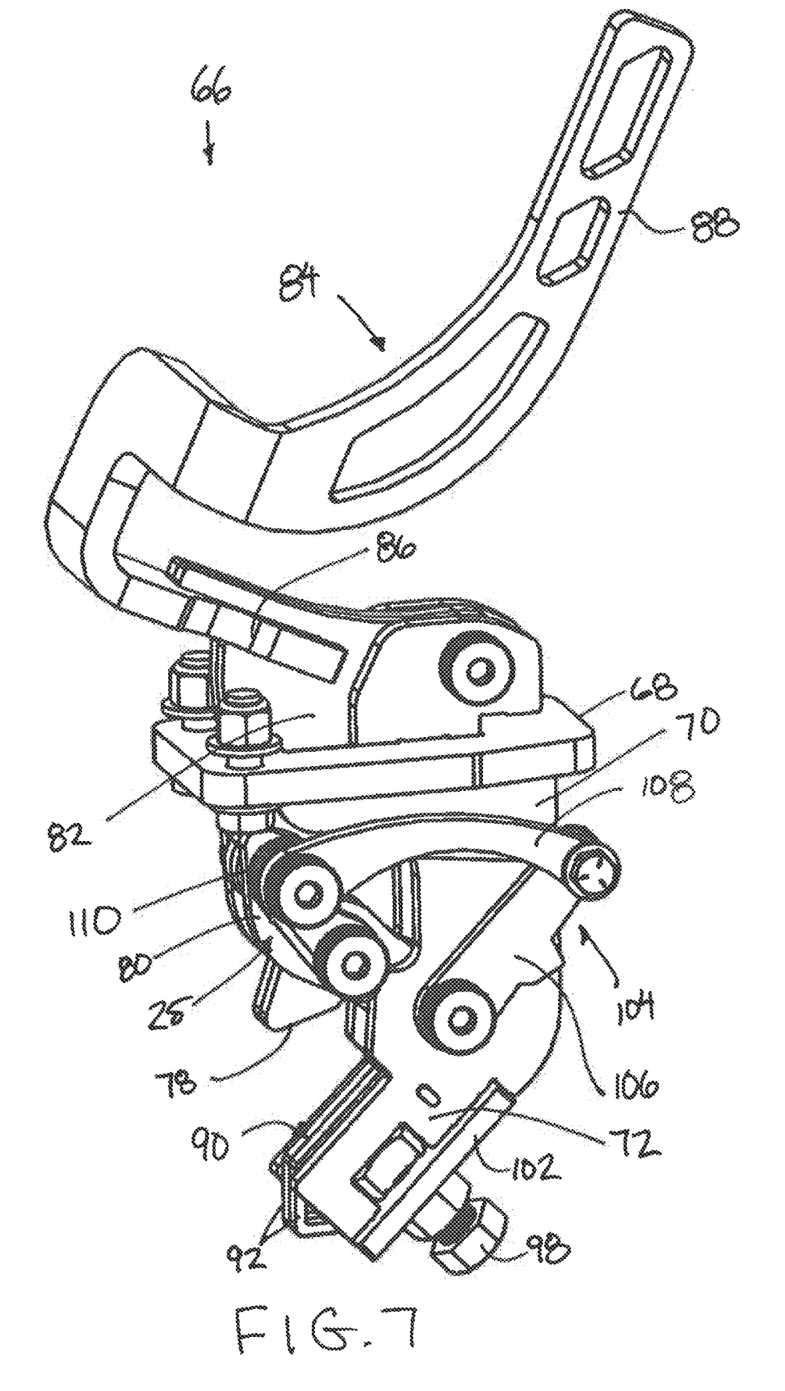
FIG. 7 is a perspective view of the latch assembly in the open position.
Figure 8:
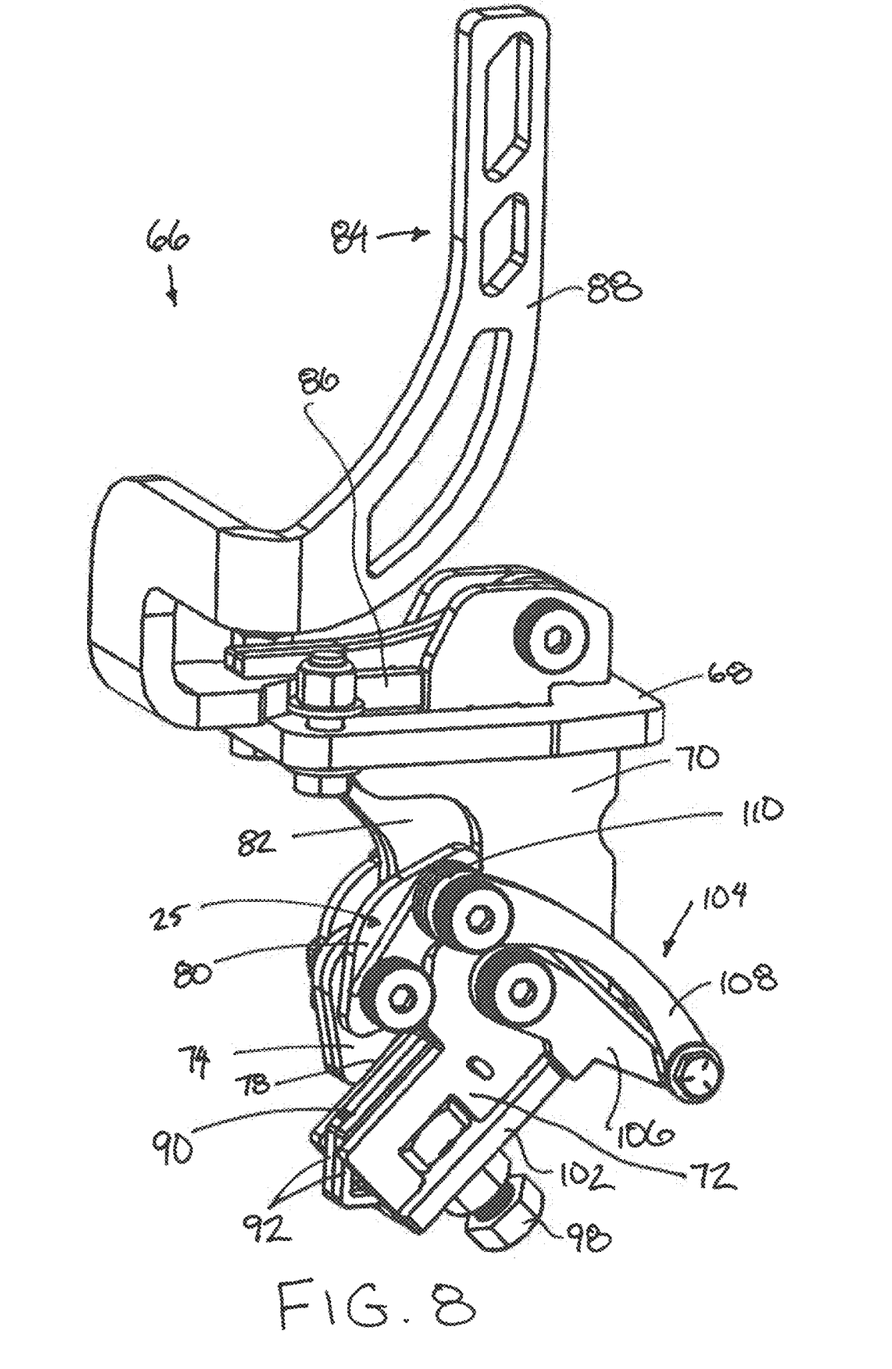
FIG. 8 is a perspective view of the latch assembly similar to FIG. 7, but shown in the closed position.
Figure 9:
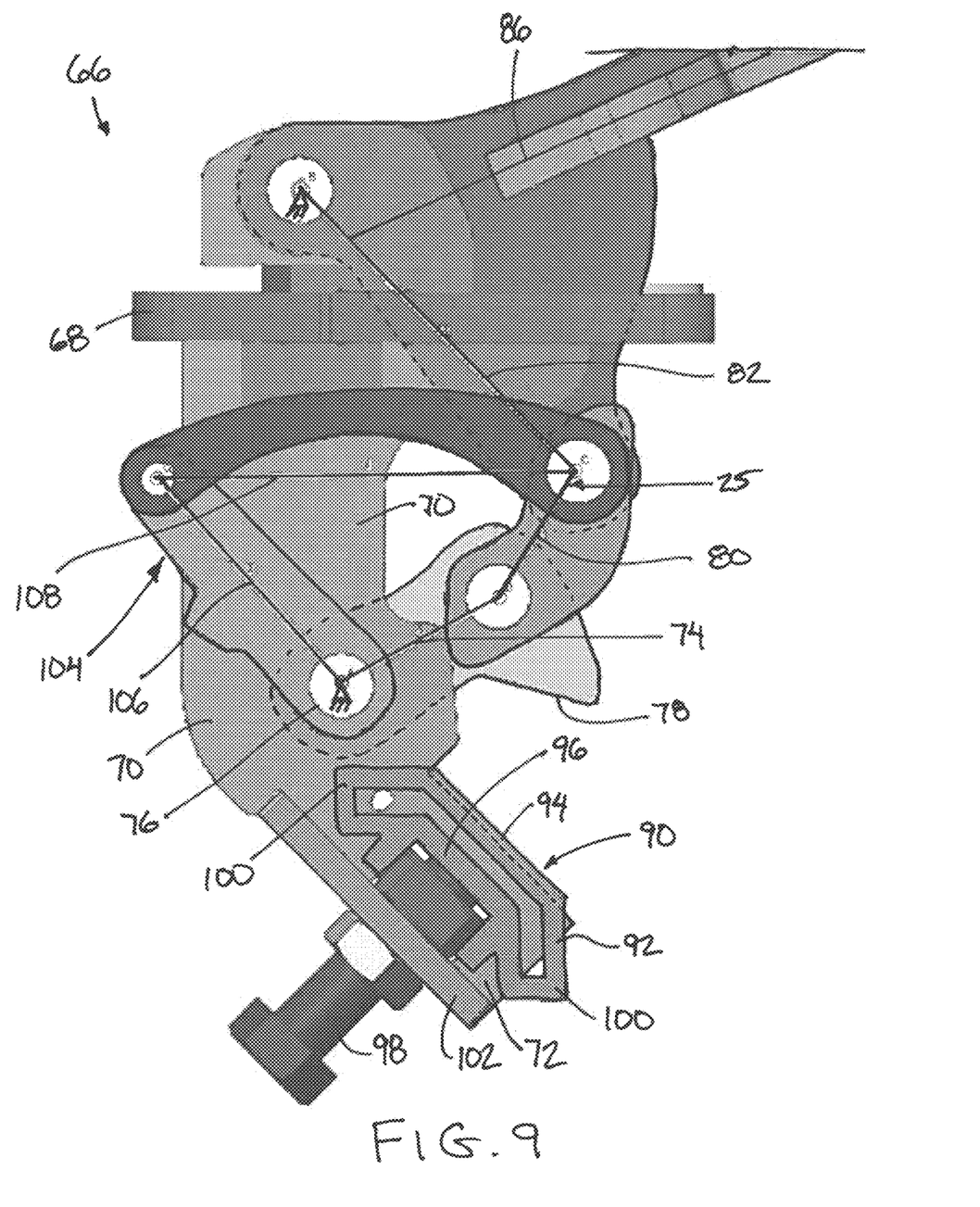
FIG. 9 is a side elevational view of the latch assembly in the open position including a schematic representation of the over-center linkage and the biasing linkage.

The assembly 10 further includes a biasing linkage 104 including a first member 106 and a second member 108. The first member 106 is pivotally connected at a first end at the pivotal connection of the clamping jaw 74 on the anchor plates 70. The second member 108 is pivotally coupled at a first end to a second end of the first member 106 and is pivotally connected at a second end at the pivotal connection between the first and second links of the over centre linkage 25. The first and second members 106 and 108 comprises link members supported at one of the outer sides of the anchor plates. The two latches 66 of the assembly may be symmetrical with one another such that one of the latches 66 shown in FIGS. 7 and 9 is a left side latch with the first and second members 106 and 108 on one side thereof, while the other latch 66 shown in FIGS. 7 and 9 is a right side latch with the first and second members 106 and 108 on the other side thereof. The first member 106 extends generally forwardly from the first end to the second end of the first member 106 at an upward slope in the open position and at a downward slope in the closed position. The second member 108 extends generally horizontally forward from the first end to the second end of the second member 108 in the open position while extending forwardly at a downward slope from the first end to the second end of the second member 108 in the closed position.

The first member 104 of the biasing linkage, the second member 108 of the biasing linkage, the clamping jaw 74, and the first link 80 of the over centre linkage collectively form four bars of a four bar linkage.

A spring 110 of the biasing linkage is presented in the form of a torsion spring coupled to the pivotal connection between the second member 108 of the biasing linkage and the first link 80 of the over centre linkage. The spring 110 provides a biasing force which acts to decrease the interior angle between the second member of the biasing linkage in the first link of the over centre linkage to spread the second member and the first link apart. Due to the geometry of the biasing linkage relative to the over centre linkage which results in the interior angle between the second member 108 in the first link 80 becoming smaller towards either of the open position or the closed position of the latch from the over centre position, the resulting effect of the biasing spring is to bias the biasing linkage and thus the connected operating linkage towards the open position throughout the range of movement of the linkages from the open position to the over centre position while biasing the biasing linkage and thus the connected operating linkage towards the closed position throughout the range of movement of the linkages from the closed position to the over centre position.

In use, the vehicle mounting portion is initially installed on a vehicle by fastening to frame members of the vehicle using the front vehicle mounts. The grill guard frame may initially extend forwardly from the hinge axis in the lowered position to provide access to the front grill of the vehicle. When use of the vehicle is desired, the grill guard frame is pivoted upwardly and rearwardly from the lowered position to the working position thereof. An operator then grips the lever handle 84 of each latch and pivots the handle rearwardly to close the latch. In closing the latches, the linkages are rotated through the over centre position to the closed position where the biasing linkage continues to act to apply biasing force to assist in retaining the linkages in the closed position, in addition to the over centre geometry working together with the resilient suspension of the second jaw to resist displacement of the over centre linkage away from the closed position.

When it is desired to access the front grill area of the vehicle, for example during servicing or maintenance of the vehicle, the operator displaces both lever handles 84 forwardly to displace the latches against the spring bias of the biasing linkage and the clamping force bias of the over centre linkage from the closed position to the open position thereof. The grill guard frame can then be freely pivoted from the working position to the lowered position thereof.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A grill guard assembly for mounting forwardly of a front grill of a vehicle, the grill guard assembly comprising:
   a vehicle coupling portion arranged for attachment to the vehicle;
   a grill guard frame;
   a grill guard coupling portion connected to the grill guard frame;
   a hinge coupling the grill guard coupling portion to the vehicle coupling portion such that the grill guard frame is pivotal with the grill guard coupling portion relative to the vehicle coupling portion about a hinge axis between a working position in which the grill guard frame extends primarily upwardly from the hinge axis and a lowered position in which the grill guard frame extends primarily forwardly from the hinge axis;
   a latch assembly comprising:
      a clamping surface fixedly mounted on a first coupling portion among the vehicle coupling portion and the grill guard coupling portion;
      a clamping jaw pivotally supported on a second coupling portion among the vehicle coupling portion and the grill guard coupling portion;
      in the working position of the grill guard frame, the clamping jaw being pivotal relative to the second coupling portion between a closed position of the clamping jaw in which the clamping jaw is firmly clamped against the clamping surface by a clamping force to prevent pivotal movement of the grill guard frame from the working position to the lowered position and an open position of the clamping jaw in which the grill guard frame is pivotal from the working position to the lowered position without interference from the clamping jaw;
      an over-center linkage connected between the clamping jaw and the second coupling portion, the over-center linkage being rotated through an over-center position between the open position and the closed position of the clamping jaw;

whereby the clamping force of the clamping jaw against the clamping surface in the closed position urges the clamping jaw into the closed position and away from the over-center position.

2. The grill guard assembly according to claim 1 wherein the over-center linkage comprises a first link pivotally coupled to the clamping jaw and a second link pivotally coupled to both the first link and the second coupling portion.

3. The grill guard assembly according to claim 2 wherein the first link and the second link of the over-center linkage are in alignment 180 degrees apart from one another in the over-center position.

4. The grill guard assembly according to claim 2 further comprising a lever handle extending outwardly from the second link of the over-center linkage so as to be arranged to be grasped in a hand of a user.

5. The grill guard assembly according to claim 1 wherein the clamping surface is located on a receiver member of the first coupling portion, the grill guard assembly further comprising a second jaw mounted on the second coupling portion, the second jaw being located opposite the clamping jaw so as to receive the receiver member clamped therebetween in the closed position of the clamping jaw.

6. The grill guard assembly according to claim 5 wherein the second jaw is resiliently supported relative to the second coupling portion.

7. The grill guard assembly according to claim 5 wherein the second jaw is adjustable in position relative to the second coupling portion in an adjustment direction oriented transversely to the clamping surface in the working position.

8. The grill guard assembly according to claim 5 wherein a clamping face of the second jaw is parallel to a clamping face of said clamping jaw in the closed position of the clamping jaw.

9. The grill guard assembly according to claim 1 further comprising a biasing linkage connected to the over-center linkage, the biasing linkage including a spring arranged to bias the over-center linkage in the closed position to remain in the closed position.

10. The grill guard assembly according to claim 9 wherein the spring of the biasing linkage is further arranged to bias the over-center linkage in the open position to remain in the open position.

11. The grill guard assembly according to claim 10 wherein the spring of the biasing linkage (i) biases the over-center linkage towards the open position throughout a range of movement of the over-center linkage between the over-center position and the open position and (ii) biases the over-center linkage towards the closed position throughout a range of movement of the over-center linkage between the over-center position and the closed position.

12. The grill guard assembly according to claim 9 further comprising:

the over-center linkage comprising a first link pivotally coupled to the clamping jaw and a second link pivotally coupled to both the first link and the second coupling portion;

the biasing linkage comprising a first member pivotally coupled to the clamping jaw and a second member pivotally coupled to both the first member and to the first link of the over-center linkage;

the clamping jaw, the first link of the over-center linkage, the first member of the biasing linkage, and the second member of the biasing linkage defining four bars of a 4-bar linkage;

the spring being connected between an adjacent pair of the four bars of the 4-bar linkage.

13. The grill guard assembly according to claim 1 wherein the clamping surface on the first coupling portion extends towards the opposing coupling portion at an upward slope.

14. The grill guard assembly according to claim 13 wherein the first coupling portion is the vehicle coupling portion and the second coupling portion is the grill guard coupling portion such that the clamping surface extends forwardly at an upward slope.

* * * * *